United States Patent [19]

Bedwell et al.

[11] Patent Number: 5,756,592
[45] Date of Patent: May 26, 1998

[54] PROCESS FOR THE PRODUCTION OF CYANATE ESTER RESINS HAVING UNIQUE COMPOSITION

[75] Inventors: William B. Bedwell, Chicago; Raymond J. Swedo, Mt. Prospect, both of Ill.; Bruce T. DeBona, Randolph, N.J.; George D. Green, Cary, Ill.

[73] Assignee: AlliedSignal, Inc., Morris Township, N.J.

[21] Appl. No.: 751,083

[22] Filed: Nov. 15, 1996

Related U.S. Application Data

[60] Provisional application No. 60/007,556, Nov. 27, 1995.

[51] Int. Cl.$^6$ .................................................. C08G 65/48
[52] U.S. Cl. .......................... 525/390; 525/480; 525/504; 528/162
[58] Field of Search ............................ 528/162; 525/504, 525/390, 480

[56] References Cited

U.S. PATENT DOCUMENTS

| | | |
|---|---|---|
| 3,113,843 | 12/1963 | Li . |
| 3,448,079 | 6/1969 | Grigat et al. . |
| 3,503,949 | 3/1970 | Gaspari . |
| 3,628,918 | 12/1971 | Beals et al. . |
| 3,809,688 | 5/1974 | Clementi et al. . |
| 4,022,755 | 5/1977 | Tanigaichi et al. . |
| 4,076,919 | 2/1978 | Urban et al. . |
| 4,713,442 | 12/1987 | Woo et al. . |
| 4,970,276 | 11/1990 | Das et al. . |
| 4,981,994 | 1/1991 | Jackson . |
| 5,025,112 | 6/1991 | Sanderson et al. . |
| 5,124,414 | 6/1992 | Sajal et al. . |
| 5,126,412 | 6/1992 | Das et al. . |
| 5,130,385 | 7/1992 | Das . |
| 5,137,989 | 8/1992 | Das . |
| 5,483,013 | 1/1996 | Roth, Jr. et al. . |

FOREIGN PATENT DOCUMENTS

| | | |
|---|---|---|
| 1195764 | 4/1972 | Germany . |
| 1201839 | 1/1973 | Germany . |
| 57-70118 | 4/1982 | Japan . |
| 84-149918 | 8/1984 | Japan . |
| 70-11712 | 1/1986 | Japan . |

OTHER PUBLICATIONS

E. Grigat & R. Putter, Chem. Ber., 97, (1964), 3012.

Primary Examiner—John M. Cooney, Jr.
Attorney, Agent, or Firm—Fisher,Christen&Sabol

[57] ABSTRACT

A continuous process for the production of a phenolic-based cyanate ester resin is provided and includes the steps of: feeding a phenolic organic compound, a trialkylamine and a cyanogen halide into a continuous, plug-flow type reactor; causing the reactants to flow through and react in the reactor over a period of time defined as a residence time; continuously reacting the phenolic organic compound, the triallcky-lamine and the cyanogen halide in the reactor; and maintaining a temperature in the reactor of between about −75° C. to about 0° C. The reactor has a length which is equal to or greater than ten times its internal diameter. The mol equivalent concentration of the cyanogen halide is greater than the mol equivalent concentration of the trialkylamine, and the mol equivalent of the trialkylamine is greater than the mol equivalent of the phenolic organic compound. The reactants are resident for a long enough time in the reactor to achieve at least substantial conversion of the phenol groups to cyanate ester groups, but for short enough a time to substantially suppress undesirable side reactions. The phenolic-based cyanate ester resins prepared by the continuous process may contain as much as 95 percent by weight or more cyanate ester groups.

25 Claims, 1 Drawing Sheet

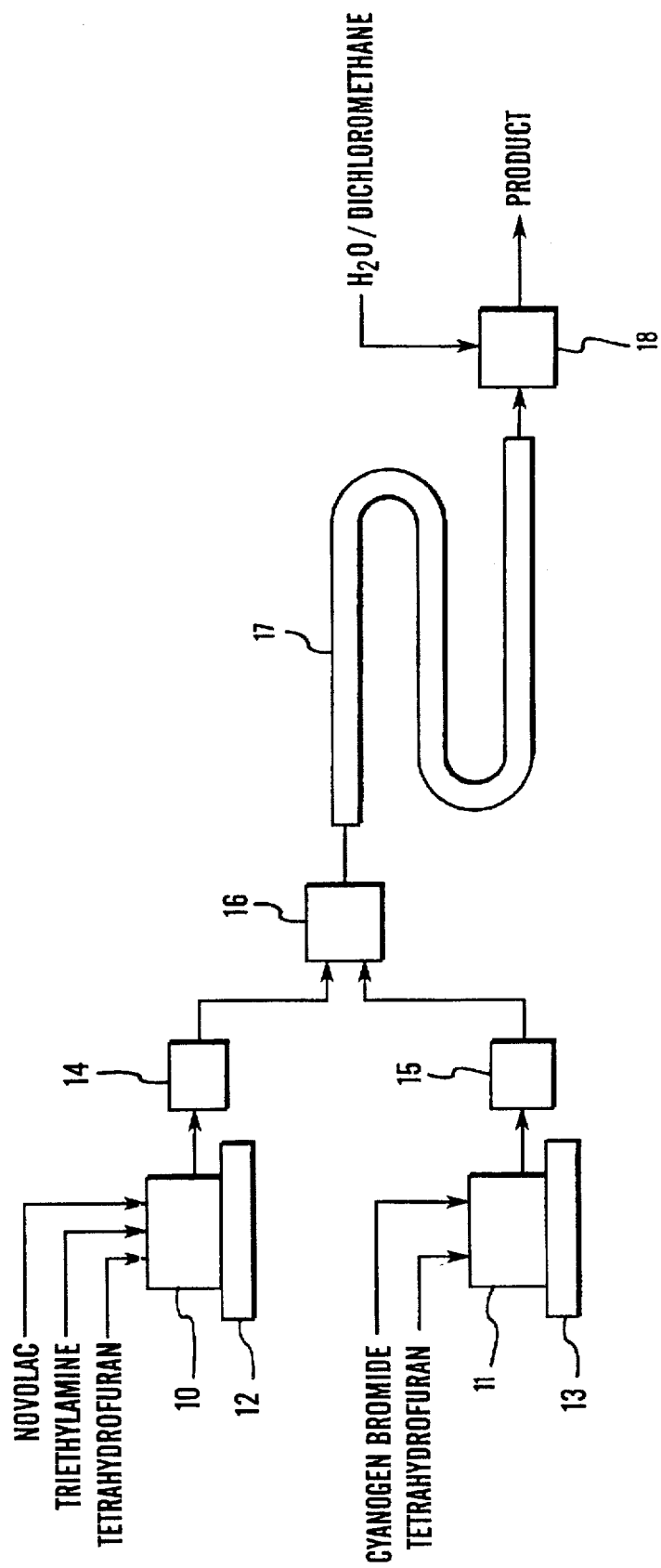
FIGURE

PROCESS FOR THE PRODUCTION OF CYANATE ESTER RESINS HAVING UNIQUE COMPOSITION

BACKGROUND OF THE INVENTION

This application claims the benefit of U.S. Provisional Application No. 60/007,556, filed Nov. 27, 1995.

FIELD OF THE INVENTION

The invention relates to a continuous reactor process utilizing a plug-flow type reactor for the synthesis of cyanate esters.

BACKGROUND ART

A simple synthesis of cyanate esters of mono- and polyphenols was first described by Grigat and Putter in 1963. See: German Patent No. 1,195,764; German Patent No. 1,201,839; and E. Grigat and R. Putter, Chem. Ber., 97, (1964), 3012.

In a later variation of the synthesis, cyanate esters of novolacs (average molecular weight of 600 to 1500) were produced by adding base to solutions of novolac and cyanogen halide in a solvent. See U.S. Pat. No. 3,448,079. Such patent also noted that an excess of cyanogen halide must be present.

Similar processes are described in Japanese Patent No. 70-11712 and U.S. Pat. No. 4,022,755. The first of these patents covered the same molecular weight range described in U.S. Pat. No. 3,448,079, but the second of these patents recommended that the molecular weight be restricted to 300 to 600. Later, Japanese Kokai No. 84-149918 described the use of trialkylamines as the base used in the cyanate ester synthesis. The novolac molecular weight covered in this later patent was 300 to 1500.

More recent U.S. Pat. No. 4,713,442 was primarily concerned with cyanate esters of phenol-norbornene condensation resins, but also included the novolacs described above. The method of synthesis involved trialkylamine as the base, with an excess of cyanogen halide.

Even more recently, U.S. Pat. No. 4,981,994 described a process in which a complex was formed between the trialkylamine and the novolac. This complex was relatively unreactive and, therefore, could be reacted with the cyanogen halide at higher temperatures than those taught in the above-identified patents.

One feature all of the above-identified patents have in common is that they are semi-batch reactor processes. Problems inherent to semi-batch reactors include long residence times, poor heat transfer, and problems with feed stoichiometry.

SUMMARY OF THE INVENTION

An object of the invention is to provide a continuous process for the synthesis of phenolic-based cyanate ester resins, which overcomes the above-mentioned prior art problems. Another object of the invention is to provide cyanate ester resins which have characteristic properties which are different from those produced by the above-described semi-batch processes. Other advantages and objects of the invention are set out herein or are obvious herefrom to one skilled in the art.

The objects and advantages of the invention are achieved by the process and product of the invention.

The invention uses an improved, continuous, plug-flow reactor for the synthesis of phenolic-based cyanate ester resins which overcomes the above-mentioned prior art inherent problems. Because of these inherent problems, the cyanate ester resins produced by the above-mentioned semi-batch reactors have characteristic compositions, but the compositions produced steady state using the improved reactor of the invention are unique, even when the same base novolac resins are used. The invention includes an improved, continuous process using the plug-flow type reactor for the synthesis of phenolic-based cyanate ester resins.

The invention involves a continuous process for the production of a phenolic-based cyanate ester resin comprising: feeding reactants into a continuous, plug-flow type reactor, the reactants comprising a phenolic organic compound, a trialkylamine and a cyanogen halide; causing the reactants to flow through and react in the reactor over a period of time defined as a residence time; continuously reacting the phenolic organic compound, the trialkylamine and the cyanogen halide in the reactor; and maintaining a temperature in the reactor of between about $-75°$ C. to about $0°$ C. The reactor has a length which is many times greater than the internal diameter of the reactor. The mol equivalent concentration of the cyanogen halide is greater than the mol equivalent concentration of the trialkylamine, and the mol equivalent of the trialkylamine is greater than the mol equivalent of the phenolic organic compound. The residence time in the reactor is long enough to achieve at least substantial conversion of the phenol groups to cyanate ester groups but short enough to substantially suppress undesirable side reactions.

BRIEF DESCRIPTION OF THE DRAWING

The present invention may be more fully understood with reference to the attached drawing FIGURE which shows a schematic diagram of a plug-flow type, continuous reactor which can be used to perform the invention process and produce the compositions of the invention.

DETAILED DESCRIPTION OF THE INVENTION

According to the present invention, a phenolic organic compound, preferably a phenolic resin, is reacted during a steady state reaction in a plug-flow type, continuous reactor to form a phenolic cyanate resin. By phenolic resin we mean reaction products, soluble or fusible in organic solvents, of aldehydes or ketones, preferably aldehydes, with phenols in the presence of acid or basic condensing agents. Instead of condensing aldehydes with phenols in an acid or alkaline solution, unsaturated hydrocarbons, preferably vinyl ethers, may be caused to undergo an addition reaction with phenols under the influence of alkaline catalysts at an elevated temperature.

Preferably, the phenolic organic compound is a novolac phenolic resin (molecular weight of 300 to 1500, e.g., about 320, about 425 and about 620). The phenolic organic compound reacts with a trialkylamine, preferably triethylamine.

The phenolic reactant can be any aromatic compound containing one or more reactive phenolic hydroxyl groups. The phenolic reactant is preferably a di- or polyhydroxy compound of the formula:

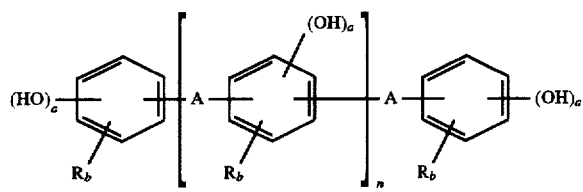

in which each of a and b is independently 0, 1, 2 or 3 and at least one a is not 0; n is within the range of 0 to about 8, preferably 0 to 3; each R is independently selected from non-interfering alkyl, aryl, alkaryl, hereroatomic, heterocyclic, carbonyloxy, carboxy, and the like ring substituents, such as hydrogen, $C_{1-6}$ alkyl, halogen, $C_{1-6}$ alkoxy, maleinimido, propargyloxy, glycidyloxy, and the like; and A is a divalent linking moiety which can be, for example, aromatic, aliphatic, cycloaliphatic, polycyclic, and heteroatomic. The phrase non-interfering substituents means substituents that do not undergo unwanted reactions with cyanogen halide or otherwise form undesirable or unwanted byproducts or cause problems in any use, reactions, etc., of the phenolic-based cyanate ester resins. Examples of linking moiety A include —O—, —SO$_2$—, —CO—, —OCOO—, —S—, $C_{1-12}$ alkanediyl, dicyclopentadienediyl, arylalkanediyl, arylene, cycloalkanediyl and a direct bond.

Such phenolic reactants include, for example, phenol, m- and p-dihydroxybenzene, 2-tert-butylhydroquinone, 2,4-dimethylresorcinol, 2,5-di-tert-butylhydroquinone, tetramethylhydroquinone, 2,4,6-trimethylresorcinol, 2,6-di-tert-butylhydroquinone, 4-chlororesorcinol; dihydroxy naphthalenes, for example, 2,4-, 1,5-, 1,6-, 1,7-, 2,6- and 2,7-dihydroxynaphthalene; dihydroxybiphenyls, for example, 4,4'-dihydroxybiphenyl, 2,2'-dihydroxybiphenyl, 3,3',5,5'-tetramethyl-4,4'-dihydroxybiphenyl, 3,3',5,5'-tetrachloro-4,4'-dihydroxybiphenyl, 3,3',5,5'-tetrachloro-2, 2'-dihydroxybiphenyl, 2,2',6,6'-tetrachloro-4,4'-dihydroxybiphenyl, 4,4'-bis-(3-hydroxyphenoxy)biphenyl, and 4,4'-bis-(4-hydroxyphenoxy)biphenyl; 2,2'-dihydroxy-1,1'-binaphthyl;dihydroxydiphenyl ethers, for example, 4,4'-dihydroxydiphenyl ether, 3,3',5,5'-tetramethyl-4,4'-dihydroxydiphenyl ether, 3,3',5,5'-tetrachloro-4,4'-dihyclroxydiphenyl ether, 4,4'-bis-(p-hydroxyphenoxy) diphenyl ether, 4,4'-bis-(phydroxyphenylisopropylidene) diphenyl ether, 4,4'-bis-(m-hydroxyphenoxy)diphenyl ether and 4,4'-bis-[4-(4-hydroxyphenoxy)phenylsulfonyl] diphenyl ether; diphenyl sulfones, for example, 4,4'-dihydroxydiphenyl sulfone, 3,3',5,5'-tetramethyl-4,4'-dihydroxydiphenyl sulfone, 3,3',5,5'-tetrachloro-4,4'-dihydroxydiphenyl sulfone, 4,4'-bis-(p-hydroxyphenylisopropylidene)diphenyl sulfone, 4,4'-bis-(4-hydroxyphenoxy)diphenyl sulfone, 4,4'-bis-(3-hydroxyphenoxy)diphenyl sulfone, 4,4'-bis-[4-[(4-hydroxyphenyl)isopropylidene]phenoxy]diphenyl sulfone and 4,4'-bis[4-(4-hydroxyphenylsulfonyl)phenoxy]diphenyl sulfone; dihydroxydiphenyl alkanes, for example, 4,4'-dihydroxydiphenylmethane, 4,4'-bis-(p-hydroxy phenyl) diphenylmethane, 2,2-bis(p-hydroxyphenyl)propane, 2,2-bis-(3,5-dimethyl-4-hydroxyphenyl)propane, 2,2-bis-(3,5-dichloro-4-hydroxyphenyl)propane, 1,1-bis-(p-hydroxyphenyl)cyclohexane, bis-(2-hydroxy-1-naphthyl) methane, 1,2-bis-(p-hydroxyphenyl)-1,1,2,2-tetramethylethane, 4,4'-dihydroxybenzophenone, 4,4'-bis-(4-hydroxyphenoxy)benzophenone, 1,4-bis-(p-hydroxyphenylisopropylidene)benzene, phloroglucinol and 2,2',5,5'-tetrahydroxydiphenyl sulfone.

Phenolic reactants can also include other phenolic novolacs, such as BPA novolac and o-cresol novolac, for example. The phenolic novolac may contain substituents as described above, including glycidyloxy, propargyloxy and $C_{1-6}$ alkyl groups.

Other phenolic resins or compounds that may be used include phenolformaldehyde oligomers or derivatives thereof of the formula:

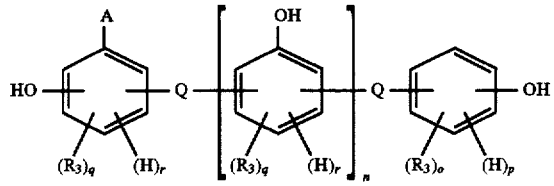

wherein n is a positive whole number equal to or greater than 1;

q and r are the same or different at each occurrence and are whole numbers from 0 to 3 with the proviso that the sum of q and r at each occurrence is equal to 3;

o and p are the same or different at each occurrence and are whole numbers from 0 to 4, with the proviso that the sum of o and p is equal to 4;

—Q— is a divalent organic radical;

A is selected from the group consisting of hydrogen, chlorine, bromine, alkyl having from 1 to 10 carbons, glycidyloxy and alkoxy having from 1 to 10 carbons; and $R_3$ is the same or different at each occurrence and is a substituent other than hydrogen which is unreactive under conditions necessary to completely cure the copolymer;

and cresol type resins; and mixtures thereof. Aromatic phenols or polyaromatic phenols may be used which will result in a stable product.

Novolacs can be prepared from phenol and formaldehyde by known methods. The novolacs useful according to the present invention often do not contain any functional groups other than the phenolic groups. However, the benzoid rings can have non-phenolic substituents, such as, methyl and other lower alkyl (e.g., $C_{1-10}$alkyl) groups. The non-phenolic substituents should not be of a nature which interferes with the formation of phenolic-based cyanate ester resins, and should not form undesirable or unwanted by-products or cause problems in any use, reactions, etc., of the phenolic-based cyanate ester resins. Novolacs prepared from phenols, and aldehydes of the formula:

$$\overset{O}{\underset{\|}{R-C-H}}$$

wherein R is an aliphatic hydrocarbyl group containing from 1 to about 10 carbon atoms, may also be used. Although formaldehyde is most commonly used, furfuraldehylde is also employed to obtain a somewhat different range of properties. With furfuraldehyde, not only the aldehyde group takes part in the reaction but the furan ring also participates in cross-linking. Phenol-furfuraldehyde resins generally have better impact strength and chemical resistance. Phenol can be replaced by m-cresol or resorcinol. Cashew nutshell oil, the major constituent of which is an unsaturated phenol called cardanol, can also be used in place of phenol. The reaction of the cyanogen halide with a phenol is catalyzed by a base. The base can be, for example, an alkali metal hydroxide such as sodium hydroxide or potassium hydroxide; an alkali metal alkylate such as sodium methylate; and various amines, preferably tertiary amines.

The resins may also be produced by first reacting the aromatic monomer, e.g., diphenyl ether, with aqueous formaldehyde in the presence of a limited amount of a solvent and a strong acid catalyst, preferably sulfuric acid. Thereafter, the product of the reaction is thereafter further reacted with a phenolic moiety to form a polymer having for each aromatic monomer, 1.1 to 7 mols of formaldehyde, and 0.1 to 6 mols of the phenol. The relative amounts of the three components will be varied to provide the desired physical properties. The initial reaction is carried out at a temperature of about 25° C. to 100° C. and the second stage is carried out at about 100° C.

In addition to the diphenyl ether, other aromatic monomers of particular interest include xylenes, naphthalene, and diphenylmethane. Formaldehyde may be replaced by paraformaldehyde, or monoaldehydes, such as, acetaldehyde, propionaldehyde, butyraldehyde, and the like which react with the aromatic compound and permit the subsequent reaction with a phenol to produce a phenolic pendant polymer. While phenol is preferred, substitued phenols can also be used such as bisphenol A, catechol, naphthol, biphenyldiols, 2-chlorophenol and methoxy phenol.

The basic catalyst is preferably a tertiary amine. Tertiary amines can be represented by the formula:

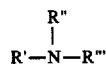

in which R', R" and R'" represent $C_{1-36}$ alkyl, preferably $C_{1-10}$ alkyl; aryl such as phenyl; and $C_{4-7}$ cycloalkyl. Examples of such tertiary amines include trimethylamine, triethylamine, methyldiethylamine, tripropylamine, tributylamine, methyldibutylamine, dinonylmethylamine, dimethylstearylamine, dimethylcyclohexylamine and diethylaniline. The preferred tertiary amine, because of its availability and catalytic activity, is triethylamine.

The cyanogen halide preferably is cyanogen chloride or cyanogen bromide. A preferred cost effect cyanogen halide is cyanogen chloride, whereas cyanogen bromide is preferred from a safety point of view. Preferably, a molar (equivalents) ratio of novolac OH equivalents to triethylamine to cyanogen halide of about 1.00:1.05:1.10, respectively, is used. Typically, the molar (equivalents) ratio of phenolic organic compound (e.g., novolac OH equivalents) to triethylamine to cyanogen halide can be between 1:1.01:1.02, respectively, and about 1:1.4:1.8, respectively. In general, effective reactive amounts of phenolic organic compound, trialkylamine and cyanogen halide are used, with the mol equivalent concentration of the cyanogen halide being greater than the mol equivalent concentration of the trialkylamine, and with the mol equivalent concentration of the trialkylamine being greater than the mol equivalent concentration of the phenolic organic compound.

According to a preferred embodiment of the invention, the reactants are carried in an inert organic solvent. Preferably, the inert solvent is tetrahydrofuran.

The reaction in the plug-flow reactor is conducted at a temperature of between about −75° C. and 0° C., but preferably at about −35° C. or less, e.g., in the range of from about −35° C. to about −40° C. Reaction temperatures above about 0° C. tend to cause an unacceptable level of carbamate substituents in the reactor effluent.

The residence time in the plug-flow type reactor depends greatly upon the concentrations of the reactants at a particular reaction temperature. At −30° C., the residence time will vary from 1 to 10 minutes, preferably from about 3 to about 6 minutes, depending upon the concentration of the reactants. The required residence time can be achieved by manipulating flow rates and reactor dimensions.

The quenching step is done with water, and more preferably with a combination of water and methylene chloride.

The phenolic-based cyanate ester resins of the invention are achieved with high (usually greater than 95 percent) conversion of the phenolic groups to cyanate ester groups. Any unreacted phenolic groups are randomly interdispersed among the resin product. The resins of the present invention contain at most very low levels of imidocarbonate groups, very low levels of carbamate groups, and very little or no triazine groups. The inventive resins contain very little or no dialkylcyanamide, no hydrolysis reaction byproducts, and no resin advancement reaction byproducts.

With a batch reactor, all of the reagents are added initially to the reactor and remain in the reactor for the same length of time. With a semi-batch reactor, some of the reactants may be added incrementally or at intervals, or some by-products removed. With a continuous reactor, the feed is continuously metered into the reactor and the effluent is continuously removed. Continuous reactors produce what is known as a steady state reaction.

A more detailed description of the present invention is initially given below in two parts. First, the key features of the reactor are described, then the reaction chemistry which makes the resin compositions of the invention unique.

KEY REACTOR FEATURES

Unlike the semi-batch reactor processes for the synthesis of cyanate esters which are described in the above-mentioned patents (and reference), the invention involves a continuous reactor process utilizing a plug-flow type reactor. In the inventive process, it is essential that the reaction be conducted at low temperature, that the mol equivalent concentration of phenolic is less than the mol equivalent concentration of trialkylamine, and that the mol equivalent concentration of trialkylamine is less than the mol equivalent concentration of cyanogen halide. It is also preferred that residence time is long enough to achieve complete (or near complete) conversion of the phenolic groups to cyanate ester groups, but short enough to suppress undesirable side reactions.

Key preferred features of the reactor are:

I. Plug Flow Reactor
  a. Reactor Tube may be constructed of any material which is not reactive with any of the reactants, solvents, or products has a length many times greater than the diameter, e.g., at least 10 times greater is immersed in an external cooling bath which can be maintained at a temperature of from about −75° C. to about 0° C.

b. Feed Vessels:

may be constructed of material which is not reactive with any of the reactants or solvents are connected to the reactor tube via feed lines c. Feed Lines:

may be constructed of any material which is not reactive with any of the reactants or solvents optionally are immersed in an external cooling bath which can be maintained at a temperature of from about −75° C. to about 0° C.

II. Feed Stoichiometry a. Feed Concentrations:

feed solutions are carefully prepared to known concentrations b. Feed Metering:
  optionally feed vessels are supported on electronic balances which continuously monitor feed solution weights
  feed solutions are introduced into the reactor via metering pumps which control flow rates
III. Residence Time
  a. Controlled By:
  feed flow rates
  length of reactor tube
IV. Quenching
  a. Excess Water:
  product stream exits reactor tube and is immediately quenched with water U.S. Pat. Nos. 4,970,276 and 5,124,414 disclose preferred reaction times of about 4 to about 6 hours, with some of the examples and comparisons therein having shorter or longer reaction times. Example 1 of U.S. Pat. No. 5,130,385 shows the time to form a triethylammonium salt of novolac and the time to slowly add cyanogen bromide plus an additional 15 minutes of stirring the reaction mixture. A similar time is set out in Example 3 of related U.S. Pat. No. 5,126,412.

The present invention does not use a loop reactor. Instead, the invention uses a residence time in the plug-flow type reactor which is long enough to achieve complete conversion of the phenolic groups to cyanate ester groups, but short enough to suppress undesirable side reactions. A plug-flow type reactor is a tubular, one pass reactor. There is minimal back mixing in the process/reactor of the present invention. A loop reactor, on the other hand, allows back mixing and recycling. The recycle of composition from the reactor means that some of the product may go through the reactor one or more times. If recycled, the product is thereby exposed in the reactor to total residence times which are not short enough to suppress undesirable side reactions.

REACTION CHEMISTRY

Cyanate ester resins are reactive materials and are capable of undergoing chemical reactions. The unique reactor of the present invention affects both the chemistry of the cyanate synthesis, and also the post-synthesis chemistry, and ultimately leads to products of unique composition.

CYANATE ESTER SYNTHESIS CHEMISTRY

The synthesis of cyanate esters from novolac resins, trialkylamines and cyanogen halides involves three key reactions.

The first of these key reactions is the formation of a cyanotrialkylammonium halide complex (I) from the trialkylamine and the cyanogen halide:

$$R_3N + CNX \xrightarrow{k_1} [R_3N-CN]^+X^- \qquad \text{(Eq. 1)}$$
$$\phantom{R_3N + CNX \xrightarrow{k_1} } I$$

wherein X is a halogen atom.

This complex is the active cyanating agent in the conversion of phenolics to phenolic-based cyanate esters (II):

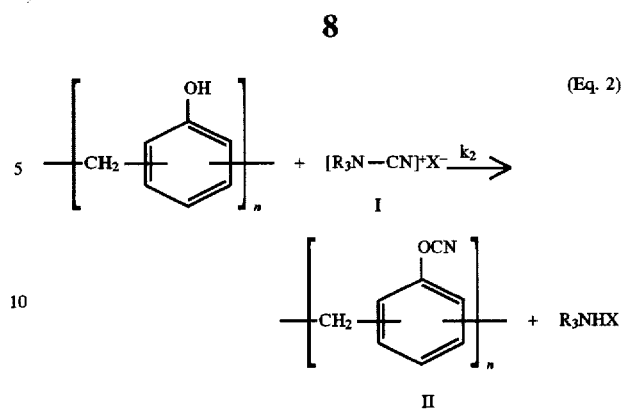

wherein X is a halogen atom, n is a whole number, and the substituent bonding on the aromatic ring structure of the phenolic generally occurs at random. Ortho and para positioning of substituents on the ring structure of the phenolic are more common than meta positioning, but specialty structures having a particular subs;tituent positioning on the ring are available and can be used. Substituent positioning on the aromatic ring structure of the precursor cyanate ester groups can be controlled during its synthesis by selecting a specially structured phenolic reactant. The positioning of substituents on the ring structure of the phenolic-based cyanate ester will be dependent upon the positioning on the phenolic reactant.

In the absence of phenolic resin, or under adverse reaction conditions, the cyanotrialkylammonium halide complex will spontaneously decompose to undesirably yield a dialkylcyanamide (III) and an alkyl halide (IV):

$$[R_3N-CN]^+X^- \xrightarrow{k_3} R_2N-CN + R-X \qquad \text{(Eq. 3)}$$
$$\phantom{[R_3N-CN]^+X^- \xrightarrow{k_3} } I \qquad\qquad III \quad\ IV$$

wherein X is a halogen atom.

In addition to generating these undesirable and toxic by-products, this decomposition reaction also consumes feed components, resulting in incomplete conversion of phenolic resin to cyanate ester resin.

All three of these key reactions are very fast, even at low temperature. See: J. V. Paukstelis and M.-g. Kim, Tetrahedron Letters, 1970, No. 54, 4731; G. Fodor and S.-y. Abidi, Tetrahedron Letters, 1971, No. 18, 1369; and G. Fodor, S.-y. Abidi and T.C. Carpenter, J. Org. Chem., 39 (11), (1974), 1507. Thus, effective and efficient dissipation of the heat of reaction is a critical aspect of the invention reactor. The invention is able to achieve effective and efficient heat dissipation through the design of the invention plug-flow reactor vessel, and the controls over process parameters available through the practice of the invention. These features are not attainable in a semi-batch reactor process.

Because of the ability of the invention to effectively control heat dissipation (and, hence, temperature) in the reactor vessel, e.g., through feed rates and cooling means, rate $k_2$ predominates over rate $k_3$. As a result of this control, the invention is able to achieve high (greater than 90 percent) conversion of phenolic groups to cyanate ester groups, even as high as 95 percent or more. This is a key point of the invention. When present, unreacted phenolic groups occur randomly interspersed among resin product molecules which are partially converted to cyanate esters. They do not occur as separate entities which can be separated away from fully cyanated molecules after the synthesis reaction is completed. Thus, control of the reaction temperature can lead to a unique product composition.

Effective suppression of $k_3$ results in a further distinction between the reactor design of the present invention and a semi-batch reactor. Suppression of $k_3$ means that the present invention utilizes a greater proportion of CNX (wherein X is a halogen atom) in the generation of cyanate ester product. Thus, the reactor of the present invention requires a smaller excess of CNX than is required in a semi-batch reactor, resulting in lower raw material costs and increased safety factors.

In addition to the three reactions shown above, undesirable side-reactions such as those shown in Equations 4A and 4B below can occur during the synthesis process. One of the most serious undesirable side reactions is the result of an imbalance in reaction stoichiometry which causes an excess of trialkylamine and phenolic resin over cyanogen halide. The trialkylamine can catalyze the intra- or intermolecular reaction of unreacted phenolic groups with cyanate ester groups, forming imidocarbonate groups (V) [see E. Grigat and R. Putter, Chem. Ber., 97, (1964), 3018]:

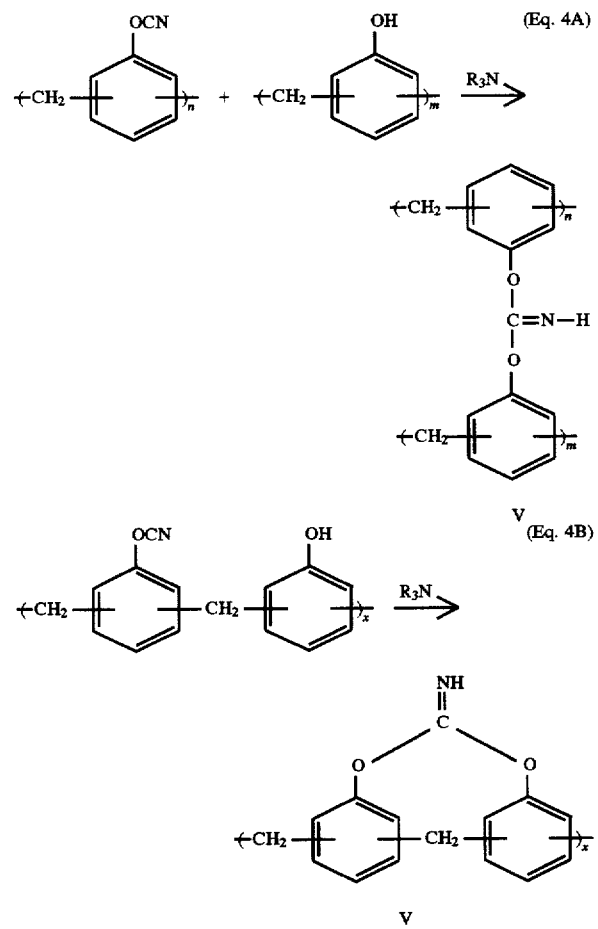

wherein m, n and x are whole numbers, and, as above, links on the aromatic structures occur at random with ortho and para positioning of substituents generally being more common than meta positioning.

These side reactions are a serious detriment to the quality of the cyanate ester resin produced. Imidocarbonate formation is a crosslinking reaction which reduces or eliminates the solubility of the cyanate ester resin product. It results in shorter resin gel times, which compromises processability. Because the present invention is able to control the feed stoichiometry through the feed composition and via the feed metering pumps, and because the invention can control reaction rates $k_1$, $k_2$ and $k_3$, imidocarbonate formation can be eliminated or at least minimized during the course of the cyanate ester resin synthesis process. Like unreacted phenolic groups, imidocarbonate groups occur randomly interspersed among cyanate ester groups along resin product molecules. They cannot be removed after completing the synthesis reaction. Thus, control of the feed stoichiometry can lead to the unique product composition of the invention.

II. POST-SYNTHESIS CYANATE ESTER CHEMISTRY

Cyanate ester resins are not inert, and are capable of undergoing further chemical reactions. A semi-batch synthesis reactor provides an ideal environment for these post-synthesis reactions. The two key detrimental environmental factors, along with their resulting reactions, are:

A. POOR TEMPERATURE CONTROL

The low surface to volume ratio found in a semi-batch reactor leads to non-uniform temperatures in the reactor. There are two serious consequences to poor temperature control:

1. PRODUCTION OF DIALKYLCYANAMIDE

As shown above in equations 1 to 3, if the reaction temperature is too high, the rate of decomposition of the cyanotrialkylammonium halide complex (I) to dialkylcyanamide (III) competes favorably with the rate of reaction of complex (I) with the phenolic resin. Thus, the cyanotrialkylammonium halide complex (I) produces dialkylcyanamide (III) rather than producing cyanate ester resin (II).

2. IMBALANCE OF STOICHIOMETRY

The decomposition of complex (I) to dialkylcyanamide (III) results in an excess of phenolic groups. As shown above in equation 4, excess phenolic groups react with cyanate ester groups to form imidocarbonate groups (V), which constitutes crosslinking. Since this reaction occurs readily even at 0° C., the poorer the temperature control, the greater the amount of crosslinking which will result.

B. PROLONGED RESIDENCE TIME

Even if good temperature control is maintained, the cyanate ester resin is produced in an environment in which it can undergo further reaction. The extent to which further reaction does take place is proportionate to the amount of time that the cyanate ester resin is kept in the reaction environment. These postsynthesis reactions affect the composition, and hence the performance, of the resin actually isolated.

The post-synthesis reactions of concern here fall into two general categories: (1) hydrolysis reactions and (2) resin advancement reactions. Examples of each such reaction are discussed below.

1. POST-SYNTHESIS HYDROLYSIS REACTIONS

To ensure complete conversion of phenolic to cyanate ester, an excess of cyanogen halide CNX is employed. The small amount of CNX remaining in the postsynthesis reaction environment can be hydrolyzed by traces of water present to yield HOCN and HX:

$$CNX + H_2O \rightarrow HOCN + HX \qquad \text{(Eq. 5)}$$

The HOCN and HX thus generated can catalyze the hydrolysis of the cyanate ester groups (II) to carbamate groups (VI):

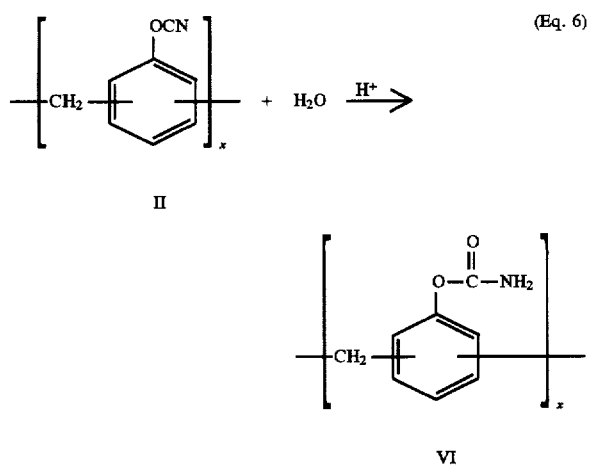

(Eq. 6)

II

VI wherein x is a whole number and the substituent positioning on the aromatic ring structure of VI depends on the substituent positioning on the ring structure of the precursor cyanate ester groups. If substituent positioning on the ring structure is random, ortho and para substituent positioning are generally more common than meta substituent positioning. This hydrolysis proceeds rapidly even in weakly acidic solutions. See: E. Grigat and R. Putter, Chem. Ber., 97, (1964), 3018; R. Stroh and H. Gerber, Angew. Chem., 72, (1960), 1000; D. Martin, Angew. Chem. Int. Ed., 3, (1964), 311; D. Martin, Chem. Ber., 97, (1964), 2689; and M. Hedayatullah and Letter. Denivelle, C.R. hebd. Seances Acad. Sci., 260, (1965), 3985.

2. POST-SYNTHESIS RESIN ADVANCEMENT REACTIONS

Of greater concern than hydrolysis of cyanate ester groups to carbamate groups is resin advancement. The acid-catalyzed trimerization of cyanate ester groups to triazine groups is well documented. [see: E. Grigat and R. Putter, Chem. Ber., 97, (1964), 3012; E. Grigat and R. Putter, Chem. Ber., 97, (1964), 3018; D. Martin, Chem. Ber., 97, (1964), 2689; M. Hedayatullah and A. Nunes, C.R. Acad. Sci. Paris, Ser. C, 265, (1967), 1124; and M. Hedayatullah. etal., Bull. Soc. Chim. Fr., (1969), 2729.] The trimerization occurs as follows:

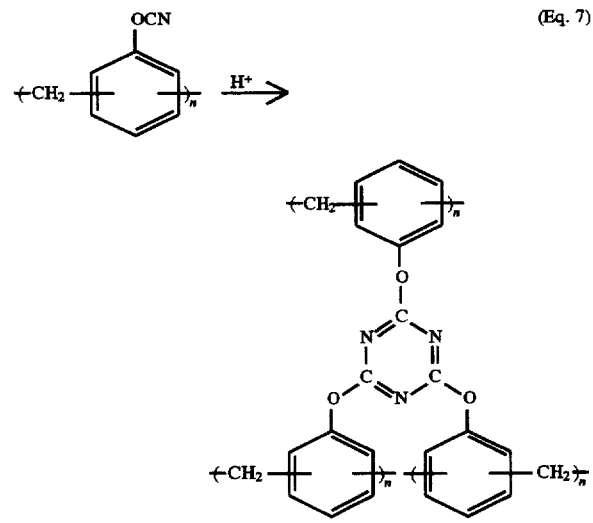

(Eq. 7)

wherein n is a whole number and the substituent positioning on the resultant aromatic structures is dependent upon the positioning of the substituents in the precursor cyanate ester groups. In addition to HOCN and HX generated from hydrolysis of excess CNX, the trialkylammonium halide salt generated in the synthesis is sufficient to catalyze this reaction. It is obvious that any amount of resin advancement will have a great effect on such resin properties as processability, gel time, and shelf-life.

These post-synthesis reactions occur randomly at sites throughout the resin backbone, and not as isolated, discrete separable molecules. Therefore, these reactions exert a profound effect on resin composition, and hence, on resin properties. In the reactor of the present invention, post-synthesis reactions are controlled by limiting reactor residence time, and by quenching the reaction mixture in cold water immediately upon exiting the reactor.

The phenolic resins or compounds are preferably novolac resins, which have the formula:

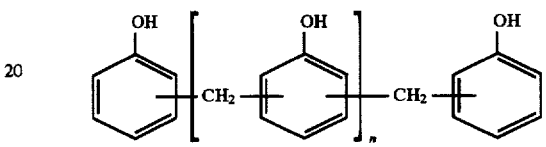

wherein n is a whole number and the substituent positioning on the aromatic structures can be specified when obtained from a manufacturer, with ortho and para positioning of substituents being preferred. If the substituent positioning is random, ortho and para links on the aromatic structures are typically more common than meta positioning.

Examples of cyanogen halide include cyanogen bromide and cyanogen chloride.

A trialkylamine of the general formula RR'R"N, in which R, R' and R" can be the same or different and each is a straight-chain or branched $C_{1-6}$alkyl group, is advantageously used. The especially preferred trialkylamine is triethylamine. Examples of useful trialkylamines are trimethylamine, tripropylamine, tributylamine, tripentylamine, trihexylamine, trioctylamine, triisopropylamine, triisobutylamine, dimethylmonoethylamine, monomethyldiethylamine, diethylmonopropylamine, diethylmonoisopropylamine, trioctylamine, N,N-diethylaniline, N-methyl piperidine, dimethyl-sec-butylamine, N-methylpyrrolidine, pyridine and the like.

As the solvent for performing the reaction, basically any inert organic solvent can be used, in which the reaction components are sufficiently soluble and which does not react with cyanogen halide or any of the other components. Examples of such inert solvents are: esters, such as, ethyl acetate or butyl acetate; ethers, such as, tetrahydrofuran, glyme, diglyme, tetrahydropyran and 3-methyltetrahydrofuran; ketones, such as, acetone, methyl ethyl ketone and ethyl propyl ketone; dimethyl sulfoxide; halogenated hydrocarbons, such as, dichloromethane, carbon tetrachloride and chloroform; amides, such as, N,N-dimethylacetamide, N,N-dimethylformamide and N-methyl-2-pyrrolidone; and mixtures thereof. A preferred solvent is tetrahydrofuran (THF). Preferred results are also obtained when dichloromethane, ethyl acetate or dioxane is used as the solvent.

The water quenching step can be followed by the addition of dichloromethane or other appropriate organic solvent. Preferably, the water quenching step is conducted by passing the reaction mixture into a container having water and dichloromethane therein.

After the water quenching step, the product can be separated and purified, if necessary, by usual methods known to those skilled in the art. The phenolic-based cyanate ester resins of the invention are important building blocks for preparing synthetic resins. The higher the molecular weight of the phenolic-based cyanate ester resins of the invention, the lower the gel time thereof. Long gel times are preferred for many applications.

RESIN CHARACTERIZATION

A number of common techniques are employed to characterize the cyanate ester resins produced via different synthetic processes. These techniques include: infrared analysis (IR), hot plate resin gel time, gas chromatography (GC), differential scanning calorimetry (DSC) and gel permeation chromatography (GPC). Through the use of these techniques, the types of functional groups present within the resin backbone, the presence of reaction synthesis by-products, and the degree to which the resin may have undergone advancement can be determined.

I. INFRARED ANALYSES

A number of infrared bands are useful in determining which functional groups are present in the cyanate ester resins. The bands employed, and their functional group assignments are listed below:

| Band Wavenumber ($cm^{-1}$) | Band Assignment |
| --- | --- |
| 3200–3500 | Phenolic (—OH) |
| 2250 | Cyanate Ester (—OCN) |
| 1710 | Carbamate(—O—C(=O)—N—H) |
| 1660 | Imidocarbonate (—O—C(=NH)—O—) |
| 1380 | Triazine |

Samples are analyzed in the form of thin films deposited on KBr plates. Analyses are conducted using a Perkin-Elmer Model 1600 FT-IR.

Band assignments are made by analysis of known compounds: novolac resins are used for the phenolic —OH band; phenyl cyanate [see D. Martin and M. Bauer, Org. Syn., 61, 35 (1983), 35] is used for the cyanate ester band; phenyl carbamate (Aldrich) is used for the carbamate band; a model imidocarbonate synthesized [see E. Grigat and R. Putter, Chem. Ber., 97, (1964), 3018] from 2,6-dimethylphenol and 4-methyl-phenyl cyanate is used for the imidocarbonate band; and 2,4,6-tri-phenoxy-1,3,5-triazine (Aldrich) is used for the triazine band.

II. HOT PLATE RESIN GEL TIME

Resin gel times are determined using a hot plate equipped with a thermocouple, which are pre-heated to and maintained at a specific temperature, often 200° C. A small sample (ca. 0.5 g) of resin is placed on the hot plate and is stirred continuously. The time elapsed from placing the resin on the plate until the resin is transformed into a gel is recorded as the resin gel time.

Differences in gel times obtained for cyanate resins synthesized from the same novolac but by different methods are a good indication of differences in resin composition.

III. GAS CHROMATOGRAPHY

Samples of cyanate ester resins are analyzed by gas chromatography to determine the levels of diethylcyanamide by-product present.

Analyses are conducted using an HP 5890 Gas Chromatograph equipped with a Supelco SP-1000 60 m×0.32 mm fused silica column, and an automatic integrator.

IV. DSC ANALYSES

DSC analyses are useful in comparing cyanate ester resins based on the same novolac but synthesized by different methods. Differences in polymerization onset and peak temperatures are indications of differences in degree of resin advancement. Differences in total heats of polymerization indicate differences in degree of resin advancement.

Analyses are conducted using a DuPont Model 9900 Thermal Analysis system. Analysis conditions were:

$\Delta T/\Delta t = 5°$ K./min (under $N_2$).

V. GPC ANALYSES

GPC analyses are used to compare resin molecular weight profiles before and after conversion to cyanate esters. Significant changes in molecular weight indicate that crosslinking or advancement occurred either during or post-synthesis.

Analyses are conducted using a Perkin-Elmer Model 250 LC pump fitted with 50 Å/5 μm to 500 Å/10 μm mixed bed PL Gel columns, and a Perkin-Elmer LC-235 UV detector monitoring at 270 nm. Calibration is done with 8 monodisperse polystyrene calibration standards ranging in molecular weight from 850,000 to 106. Column temperature is maintained at 35° C. The solvent employed is ethyl acetate, the flow rate is 1.0 ml/minute, and the injection volume is 1 μl.

Molecular weights obtained from these analyses are based upon the retention times of 8 monodisperse polystyrene calibration standards ranging in molecular weight from 850,000 to 106. No attempt is made to convert these values to absolute cyanate ester resin weights.

The cyanate esters of this invention may also be polyaromatic cyanate esters prepared by contacting a suitable polyaromatic phenol with cyanogen halide, in the presence of a tertiary amine.

The invention may be more fully understood with reference to the non-limiting Examples set forth below.

EXAMPLES 1 TO 4

Examples 1 to 4 were tested under the following pilot plant conditions. The pilot plant conditions were selected somewhat on the basis of convenience and may not be preferred for a full-scale production process. The reactors used comprised 152.4 m (500 feet) of polypropylene tubing having an outer diameter of 0.95 cm (0.375 inch) and an inner diameter of 0.64 cm (0.25 inch).

Temperature was controlled with a number of means. The reactor, feed precooling lines and the mixing block were immersed in a bath. The bath comprised about 363.7 l (about 80 gallons) of a salt slurry disposed in a plastic trough. The slurry was a mixture of calcium chloride and water having a freezing point of between about −35° to −40° C. The freezing point temperature of the slurry was maintained by adding crushed dry ice to the bath, as needed, and keeping the bath agitated.

The two pre-cooling feed lines were each 6.1 m (20 ft.) long and made of corrosion resistant alloy, widely available as INCONEL® 600 tubing. The two precooling feed lines were provided, each having an outer diameter (OD) of 0.64 cm (¼ inch), and each being followed by a short length of polypropylene tubing connected to the mixing block. The mixing block had a volume of approximately 8 cc.

Reactor outlet was collected in a 250 l (55 gallon) drum containing 54.6 l (12 gallons) of water. Extra barrels were brought on-line when the previous barrel was ¾ full.

EXAMPLE 1

A first solution, solution A, was prepared and comprised 39.25 kg of tetrahydrofuran (THF), 19.59 kg of dichloromethane, 13.77 kg of triethylamine and 13.65 kg of BORDEN SD333A novolac. A second solution, solution B, was prepared and comprised 55.58 kg of THF, 27.77 kg of dichloromethane and 17.04 kg of cyanogen bromide.

In operation, solutions A and B were pumped through the pilot system in such a way as to achieve a 5.5 minute residence time in the 152.4 meter (500 foot) tube. The stoichiometry of the mixture was 1.10 mols of cyanogen bromide for every 1.0 mol of phenol equivalent based on the novolac. The cooling bath temperature was maintained between −40° C. and −35° C. The reactor effluent was quenched and collected in 250 l (55 gallon) barrels, as described above. After the reaction period, the product barrels were washed with water four more times using 68.2 l (15 gallons) per wash. Small samples of the washed product were evaluated in the laboratory after evaporating the solvents with a rotovap. The bulk of the product was evaporated with a wiped film evaporator and used for product development investigations.

Attributes of the isolated product were analyzed. IR analysis detected negligible phenolic, no carbamate, and strong cyanate ester. The product had a gel time of 35 minutes at 215° C. The amount of diethylcyanamide detected by gas chromatography was 0.1 percent by weight.

EXAMPLE 2

This Example was designed to determine the effect of immediate quenching in water. The process described in Example 1 was run with essentially the same details. Samples of reactor effluent were collected in 2.27 l (½ gallon) glass jugs and accumulated over a two minute period. Jug No. 1 contained about 600 ml of water and jug No. 2 contained no water. Jug No. 2 was allowed to stand for 4 minutes before about 600 ml of water was added thereto. The samples were then washed with water 5 times.

The gel time for the product from Jug No. 1 was 35 minutes at 200° C., whereas, for the Jug No. 2 product, the gel time was 27 minutes at 200° C. The weight percent of diethylcyanamide detected by gas chromatography was 0.07 percent in the Jug No. 1 product, and 0.25 percent in the Jug No. 2 product.

EXAMPLE 3

This Example was designed to determine the effect of reaction temperature. The process described in Example 1 was run with essentially the same details. Samples of reactor effluent were collected in 2.27 l (½ gallon) glass jugs and accumulated over a two minute period. Each jug contained about 600 ml of water. A first reaction, reaction No. I, was conducted with a cooling bath temperature maintained at about −16° C. A second reaction, reaction No. II, was conducted with a cooling bath temperature maintained at about −25° C. The samples were then washed with water 5 times.

The gel time for the reaction No. I product was 16 minutes at 195° C., whereas, for the reaction No. II product, the gel time was 25 minutes at 195° C. The weight percent of diethylcyanamide detected by gas chromatography was 1.7 percent in the reaction No. I product, and 0.5 percent in the reaction No. II product.

EXAMPLE 4

This Example was designed to demonstrate the improved performance attained from high molecular weight starting materials. The process described in Example 1 was followed with the exceptions that: solution A comprised 10.455 g of THF, 2.698 g of triethylamine, and 2.692 g of BORDEN SD405A novolac, available from Borden, Inc., North American Resins Industrial Products Group, Louisville, Ky.; and solution B comprised 14.688 g of THF and 3.375 g of cyanogen bromide.

The gel time of the product was 70 minutes at 168° C., compared to a gel time of 12 minutes from a product made of the same ingredients but synthesized in a semi-batch reactor. The semi-batch reactor used for the comparison comprised a pot maintained at −35° C. and filled with solution B, to which solution A was added over about a two hour period. Addition of solution A in the semi-batch process required two hours to keep heat dissipation acceptable and maintain the low reaction temperature.

In Examples 5 to 12, the Borden novolacs mentioned are available from Borden, Inc., North American Resins Industrial Products Group, Louisville, Ky.

EXAMPLE 5

This example may illustrate the continuous process synthesis of cyanate ester resin based on Borden SD333A novolac (molecular weight about 320). The FIGURE is a schematic of the plug-type continuous reactor scheme.

Feed vessel 10 may be charged with Borden SD333A novolac, triethylamine, and tetrahydrofuran (THF). Feed vessel 11 may be charged with cyanogen bromide and THF. Feed solutions 10 and 11 may be at 25° C. Each feed vessel 10 and 11 may be mounted on an electronic top-loading balance (12,13).

Each feed vessel 10 and 11 may be equipped with a metering pump (14, 15), and each may be connected to Teflon® mixing block 16 via polypropylene tubing feed lines.

Tubular reactor 17 itself may consist of a coil of polypropylene tubing. Tubular reactor 17 may be connected to Teflon® mixing block 16 at one end, and to product collection vessel 18 at the other.

The continuous cyanate ester resin synthesis may be conducted by metering feed solutions 10 and 11 at appropriate average rates into the mixing block 16. This may result in an average molar ratio of reactants of 1.00:1.05:1.10 for novolac: triethylamine: CNBr, respectively. Cyanate ester resin synthesis may be continued until the feeds are exhausted. The average residence time in the reactor 17 may be 5 minutes.

In order to dissipate the heat of reaction, portions of each feed line between metering pumps 14, 15 and mixing block, the mixing block 16 itself, and all but a small portion of tubular reactor 17 may be immersed in a cooling bath (not shown). Throughout the reaction, the cooling bath may be maintained at −35° C. The temperature of the reaction mixture exiting from the tubular reactor may be −35° C.

Immediately upon exiting from tubular reactor 17, reaction mixture may be quenched in collection vessel 18 containing water and dichloromethane.

After cyanate ester resin synthesis may be completed, the aqueous layer in collection vessel 18 may be siphoned off. The dichloromethane product solution in collection vessel 18 may then be treated with five successive water washings, each equal in volume to the product solution. Each water layer may be siphoned off from the product solution.

Cyanate ester resin product may be isolated by rotary evaporation under an appropriate vacuum, and at an appropriate bath temperature.

17

The yield of cyanate ester resin product may be quantitative except for small mechanical losses.

IR analysis of the cyanate ester resin product may show a small OH band (which may correspond to ≥95 mol percent conversion), a strong OCN band, and no triazine band. The resin may have a gel time of 35 minutes. GC analysis may indicate the presence of 0.01 wt. percent of diethylcyanamide (DEC). DSC analysis may show a polymerization onset at 200° C., and a polymerization peak temperature of 259° C. The total heat of polymerization may be 626 J/g. The GPC analysis may indicate $MW_N=1125$ and $MW_W=2059$.

EXAMPLE 6 (Comparison Example)

This example illustrates the semi-batch process synthesis of cyanate ester resin based upon Borden DS333A novolac. A molar ratio of 1.00:1.05:1.10 for novolac OH equivalents:triethylamine:cyanogen bromide, respectively, is employed.

A 300 ml 4-neck flask is fitted with a mechanical stirrer, an addition funnel, an $N_2$ inlet, and a thermocouple. The flask is charged with 11.65 g (0.110 mols) of cyanogen bromide and 15 ml of THF. While stirring under an $N_2$ atmosphere, the solution is cooled to –63° C. by means of an external Dry Ice-acetone bath. A solution containing 10.00 g (0.094 mol equivalents of OH) of Borden SD333A novolac, 10.46 g (0.1043 mols) of triethylamine, and 25 ml of THF is charged into the addition funnel. This solution is added to the cold, stirred cyanogen bromide solution over a period of 4.5 minutes, keeping the reaction temperature at ≤–20° C. during the addition. After completing the addition, the reaction mixture is stirred at –35° C. for an additional 1.5 minutes, then 100 ml of ice water is added. This mixture is stirred for 1.5 minutes, then 50 ml of $CH_2Cl_2$ is added. The mixture is transferred to a separatory funnel, and the layers are separated. The $CH_2Cl_2$ layer is washed with five 100 ml portions of cold water, and then the solvent is removed by rotary evaporation at a bath temperature of 40° C. and 40 mm Hg pressure. The yield of cyanate ester resin product is quantitative.

IR analysis of the cyanate ester resin product shows OH/NH bands (corresponding to >5 mol percent), a strong OCN band, a significant carbamate band, and a strong triazine band. The resin has a gel time of 18 minutes. GC analysis shows the presence of 0.6 wt. percent of DEC. DSC analysis of the cyanate ester resin product shows a polymerization onset temperature of 200° C., and a polymerization peak temperature of 264° C. Total heat of polymerization is 522 J/g. GPC analysis gives $MW_N=1539$ and $MW_W=2792$.

Comparing the analyses of the cyanate ester resin produced by the semibatch process with those of the resin which may be produced by the continuous process, it may be seen that the compositions of the two resins may be different. The method of synthesis may have a profound effect on resin composition. The resin produced by the continuous process may be much more uniform in composition, and, consequently, may have better properties.

From the IR analysis, it can be seen that NH, carbamate, and triazine functional groups are present in the semi-batch product, but may not be in the continuous product.

The presence of the triazine group in the semi-batch product is an indication that the resin has undergone a degree of advancement. This is further indicated by the higher GPC molecular weights obtained for the semi-batch product, by its shorter gel time, and by its lower heat of polymerization.

18

The carbamate group present in the semi-batch product is the result of partial hydrolysis of the OCN groups.

EXAMPLE 7

This example may illustrate the continuous process synthesis of cyanate ester resin based on Borden SD1711 novolac (molecular weight about 425). The continuous reactor shown in the FIGURE may be again used.

Feed vessel 10 may be charged with Borden SD1711 novolac, triethylamine, and THF. Feed vessel 11 may be charged with cyanogen bromide and THF.

The continuous cyanate ester resin synthesis may be conducted by metering feed solutions 10 and 11 at the appropriate average rate into mixing block 16. This may result in an average molar ratio of reactants of 1.00:1.05:1.10 for novolac OH equivalents:triethylamine:cyanogen bromide, respectively. Cyanate ester resin synthesis may be continued, until the feeds are exhausted. The average residence time in the reactor may be 5 minutes.

The reaction may be terminated, and the cyanate ester resin may be isolated, as described in Example 1 above.

IR analysis, gel time, GC analysis and DSC analysis of the cyanate ester resin product may be conducted. The total heat of polymerization may be measured.

EXAMPLE 8 (Comparison Example)

This example illustrates the semi-batch process synthesis of cyanate ester resin based upon Borden SD1711 novolac. A molar ratio of 1.00:1.05:1.10 for equivalents of novolac OH: triethylamine: cyanogen bromide, respectively, is employed.

The procedure followed is the same as described in Example 6, except that a solution of 30.00 g (0.282 mol equivalents of OH) of Borden SD1711 novolac and 29.96 g (0.296 mols) of triethylamine in 70 ml of THF is added to a solution of 32.87 g (0.310 mols) of cyanogen bromide in 35 ml of THF. During the addition, the reaction mixture is maintained at ≤–60° C. The addition is completed in about 15 minutes. After the addition, the reaction mixture is allowed to stir for 5 minutes without external cooling. The reaction is quenched by pouring it onto 1,000 g of ice, and then stirred with 300 ml of $CH_2Cl_2$. The remainder of the work-up is conducted as described in Example 6. The yield of cyanate ester resin is 93 percent.

IR analysis of the cyanate ester resin product shows OH/NH bands (corresponding to >5 mol percent), a strong OCN band, and a significant triazine band. The resin has a gel time of 1.6 minutes at 195° C. DSC analysis of the product shows a polymerization onset temperature of 125° C., and a polymerization peak temperature of 241° C. Total heat of polymerization is 284 J/g. GPC analysis gives $MW_N=1652$ and $MW_W=4726$.

Comparing the analyses of the SD1711-based cyanate ester resin produced by the semi-batch process described in this Example with those of the resin which may be produced by the continuous reactor described in Example 7, it may again be seen that the compositions of the two resins may be different. The method of synthesis may have a profound effect on the composition of the resin produced.

IR analyses show that OH/NH and triazine are present in the semi-batch product but may not be in the continuous product. The gel time of the semi-batch product may be significantly shorter than that of the continuous product, which may reflect difference in composition observed in the IR analyses. The GPC analyses may show a much higher

19

MW$_w$ for the semi-batch product than for the continuous product, which indicate that the semi-batch product may have undergone advancement. DSC analysis may further corroborate resin advancement which may be seen in the GPC analyses which may indicate an earlier polymerization for the semi-batch product.

EXAMPLE 9

This example may illustrate the continuous process synthesis of cyanate ester resin based on Borden SD405A novolac (molecular weight about 620). The continuous reactor shown in the FIGURE may be again used.

Feed vessel 10 may be charged with Borden SD405A novolac, cyanogen bromide, and THF. Feed vessel 11 may be charged with triethylamine and THF.

The continuous cyanate ester resin synthesis may be conducted by metering feed solutions 10 and 11 at appropriate average rates into mixing block 16. This may result in an average molar ratio of 1.00:1.05:1.10 for novolac OH equivalents:triethylamine:cyanogen bromide, respectively. Cyanate ester resin synthesis may be continued until the feeds are exhausted. Average residence time in the reactor may be 5 minutes.

The reaction may be terminated, and the cyanate ester resin may be isolated, as described in Example 1 above.

IR analysis, gel time, GC analysis and DSC analysis of the ester resin product may be conducted. The total heat of polymerization may be measured.

EXAMPLE 10 (Comparison Example)

This example illustrates the semi-batch process synthesis of cyanate ester resin based on Borden SD405A novolac. A molar ratio of 1.00:1.05:1.10 for equivalents of novolac OH:triethylamine:cyanogen bromide, respectively, may be employed.

The procedure followed may be the same as described in Example 2, except that a solution of triethylamine and THF may be added to a solution of Borden SD405A novolac, cyanogen bromide, and THF. During the addition, the temperature of the reaction mixture may be maintained at ≦-60° C. The reaction is quenched by water/dichloromethane. The remainder of the work-up may be conducted as described in Example 6.

IR analysis, gel time, GC analysis and DSC analysis of the cyanate ester product may be conducted. The total heat of polymerization may be measured.

Comparing the analyses of the SD405A-based cyanate ester resin which may be produced in Example 10 using the semi-batch reactor with that which may be produced in the continuous reactor described in Example 9, it may be seen that the compositions of the two resins may be different. The method of synthesis may have a profound effect on the composition of the resin produced.

EXAMPLE 11

This example may illustrate the critical nature of controlling reaction temperature on the compositions of the resins produced. The cyanate ester resins which may be synthesized in this example are based on Borden SD333A novolac. The continuous reactor shown in the FIGURE may be used in the syntheses in this example.

As described in Example 5, feed vessel 10 may be charged with Borden SD333A novolac, triethylamine, and THF. Feed vessel 11 may be charged with cyanogen bromide and THF.

20

The synthesis may be conducted by metering feed solutions 10 and 11 into mixing block 16, resulting in an average ratio of 1.00:1.05:1.10 for novolac OH equivalents:triethylamine:cyanogen bromide, respectively. The synthesis may be conducted with the cooling bath maintained at a temperature of -35° C. The average residence time may be 5 minutes. The reaction may be quenched, and work-up may be conducted as described in Example 5.

The cyanate ester resin synthesis may be repeated as described above, except that the cooling bath temperature may be maintained at higher than -35° C. (but below about 0° C.).

The effects of varying temperature on the composition of the resin produced, may show that control of temperature may be critical to controlling resin composition.

EXAMPLE 12

This example may illustrate the critical nature of controlling reaction residence time to prevent post-synthesis reactions from occurring. The cyanate ester resin which may be synthesized in this example is based on Borden SD333A novolac. The continuous reactor shown in the FIGURE may be used in this synthesis.

As described in Example 5, feed vessel 10 may be charged with Borden SD333A novolac, triethylamine, and THF. Feed vessel 11 may be charged with cyanogen bromide and THF.

The continuous cyanate ester resin synthesis may be conducted by metering feed solutions 10 and 11 into mixing block 16, resulting in an average molar ratio of reactants of 1.00:1.05:1.10 for novolac OH equivalents:triethylamine:cyanogen bromide, respectively. The average residence time in the reactor may be 5 minutes.

In this example, the reaction quenching may be varied. In the control case, the reactor stream may be quenched immediately, as described in Example 5. In the test cases, portions of the reactor stream may be collected in separate containers maintained at room temperature. These aliquots may be held for specific time periods before being quenched. The differences may be observed which may result from post-synthesis reactions involving hydrolysis and advancement of the cyanate ester resin produced.

Although the present invention has been described with reference to preferred embodiments, it will be appreciated that many additions, deletions, substitutions and modifications may be made without departing from the spirit and scope of the invention as defined in the appended claims.

What is claimed is:

1. A continuous process for the production of a phenolic-based cyanate ester resin comprising: feeding reactants into a continuous, plug-flow reactor, said reactants comprising a phenolic organic compound, a trialkylamine and a cyanogen halide; causing said reactants to flow through and react in said reactor over a period of time defined as a residence time; continuously reacting said phenolic organic compound, said trialkylamine and said cyanogen halide in said reactor; and maintaining a temperature in said reactor of between about -75° C. to about 0° C., the reactor having a length which is at least ten times greater than the internal diameter of the reactor, the mol equivalent concentration of the cyanogen halide being greater than the mol equivalent concentration of the trialkylamine, the mol equivalent concentration of the trialkylamine being greater than the mol equivalent concentration of the phenolic organic compound, the residence time in the reactor being long enough to achieve at least substantial conversion of the phenol groups to cyanate ester groups but short enough to substantially suppress undesirable side reactions.

2. The continuous process as claimed in claim 1, wherein said process further includes the step of immediately quenching with water the product stream exiting the reactor.

3. The continuous process as claimed in claim 1, wherein said process further includes the step of immediately quenching the product stream exiting the reactor with water and dichloromethane.

4. The continuous process as claimed in claim 1, wherein said phenolic organic compound is a novolac phenolic resin having a weight average molecular weight of from about 300 to about 1500.

5. The continuous process as claimed in claim 1, wherein said phenolic organic compound is a novolac phenolic resin having a weight average molecular weight of from about 320 to about 620.

6. The continuous process as claimed in claim 1, wherein said trialkylamine is triethylamine.

7. The continuous process as claimed in claim 1, wherein said cyanogen halide is at least one member selected from the group consisting of cyanogerin chloride and cyanogen bromide.

8. The continuous process as claimed in claim 1, wherein said cyanogen halide is cyanogen chloride.

9. The continuous process as claimed in claim 1, wherein said residence time in the reactor is long enough to achieve at least 95 percent conversion of the phenol groups to cyanate ester groups.

10. The continuous process as claimed in claim 1, wherein said residence time in the reactor is long enough to achieve at least 90 percent conversion of the phenol groups to cyanate ester groups.

11. The continuous process as claimed in claim 1, wherein the temperature in the reactor is maintained at between about −35° C. and about −40° C.

12. The continuous process as claimed in claim 1, wherein said reactants are provided in at least one inert organic solvent in which the reactants are sufficiently soluble and which does not react with the cyanogen halide.

13. The continuous process as claimed in claim 12, wherein said inert solvent is tetrahydrofuran.

14. The continuous process as claimed in claim 1, wherein said phenolic organic compound and said trialkylamine are provided in a first solution comprising a first inert organic solvent, and said cyanogen halide is provided in a second solution comprising a second inert organic solvent, said step of feeding reactants comprising feeding said first and second solutions into a mixing chamber to form a mixture and immediately feeding said mixture into said reactor.

15. The continuous process as claimed in claim 14, wherein said first and second solutions each comprises tetrahydrofuran.

16. The continuous process as claimed in claim 14, wherein said first and second solutions each comprises tetrahydrofuran and methylene chloride.

17. The continuous process as claimed in claim 1, wherein said phenolic organic compound is a novolac phenolic resin having a weight average molecular weight of from about 300 to about 1500, said trialkylamine is triethylamine, and said cyanogen halide is at least one member selected from the group consisting of cyanogen chloride and cyanogen bromide.

18. Phenolic-based cyanate ester resin prepared by the continuous process of claim 1.

19. Phenolic-based cyanate ester resin prepared by the continuous process of claim 17.

20. The continuous process as claimed in claim 17, wherein said process further includes the step of immediately quenching with water the product stream exiting the reactor.

21. The continuous process as claimed in claim 17, wherein said process further includes the step of immediately quenching the product stream exiting the reactor with water and dichloromethane.

22. Phenolic-based cyanate ester resin prepared by the continuous process of claim 2.

23. Phenolic-based cyanate ester resin prepared by the continuous process of claim 3.

24. Phenolic-based cyanate ester resin prepared by the continuous process of claim 20.

25. Phenolic-based cyanate ester resin prepared by the continuous process of claim 21.

* * * * *